(12) United States Patent
Hall et al.

(10) Patent No.: US 12,467,023 B2
(45) Date of Patent: *Nov. 11, 2025

(54) ALCOHOLIC BEVERAGE AND METHOD OF MAKING THE SAME

(71) Applicant: BRAIN BREW VENTURES 3.0, INC., Newtown, OH (US)

(72) Inventors: Douglas B. Hall, Newtown, OH (US); Bruce Forsee, Newtown, OH (US); Joseph M. Girgash, Newtown, OH (US); James J. Beaupre, Glenburn, ME (US)

(73) Assignee: Brain Brew Ventures 3.0, Inc., Newtown, OH (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/768,614

(22) PCT Filed: Oct. 17, 2016

(86) PCT No.: PCT/US2016/057297
§ 371 (c)(1),
(2) Date: Apr. 16, 2018

(87) PCT Pub. No.: WO2017/066740
PCT Pub. Date: Apr. 20, 2017

(65) Prior Publication Data
US 2018/0305649 A1    Oct. 25, 2018

Related U.S. Application Data

(60) Provisional application No. 62/242,396, filed on Oct. 16, 2015.

(51) Int. Cl.
*C12G 3/07* (2006.01)
*C12H 1/00* (2006.01)
(Continued)

(52) U.S. Cl.
CPC ............. *C12G 3/07* (2019.02); *C12H 1/00* (2013.01); *C12H 1/16* (2013.01); *C12H 1/18* (2013.01); *C12H 1/22* (2013.01); *C12H 6/02* (2019.02)

(58) Field of Classification Search
CPC ................................. C12G 3/07; C12H 1/22
(Continued)

(56) References Cited

U.S. PATENT DOCUMENTS

| 889,828 A | 6/1908 | Trescott |
|---|---|---|
| 1,017,647 A | 2/1912 | Burton |

(Continued)

FOREIGN PATENT DOCUMENTS

| CA | 2740069 C | 2/2017 |
|---|---|---|
| DE | 2618226 A1 | 11/1977 |

(Continued)

OTHER PUBLICATIONS

PCT Notification of Transmittal of the International Search Report and the Written Opinion of the International Searching Authority, or the Declaration. Dated Dec. 19, 2016 (Dec. 19, 2016).

(Continued)

*Primary Examiner* — Vera Stulii
(74) *Attorney, Agent, or Firm* — Frost Brown Todd LLP; Vance V. VanDrake, III; Alexander J. Johnson

(57) ABSTRACT

The present invention is an alcoholic beverage having the sensory characteristics of a traditionally aged distilled spirit. The method for making the alcoholic beverage includes introducing a ratio of wood chips to a distilled spirit and applying pressure to create interaction between the wood chips and distilled spirit.

29 Claims, 2 Drawing Sheets

(51) Int. Cl.
  *C12H 1/16* (2006.01)
  *C12H 1/18* (2006.01)
  *C12H 1/22* (2006.01)
  *C12H 6/02* (2019.01)

(58) Field of Classification Search
  USPC ......... 426/592, 494, 425, 489, 330.3, 330.4, 426/429, 431, 11, 15
  See application file for complete search history.

(56) References Cited

U.S. PATENT DOCUMENTS

| | | | |
|---|---|---|---|
| 1,964,372 | A | 6/1934 | Tygart |
| 2,027,099 | A | 1/1936 | Hochwalt et al. |
| 2,114,331 | A | 4/1938 | Brown |
| 2,145,243 | A | 1/1939 | Bagby |
| 2,807,547 | A | 9/1957 | Nickol |
| 3,372,633 | A * | 3/1968 | Horlander, Jr. ........ B65D 25/14 99/277.1 |
| 3,943,841 | A | 3/1976 | Huang |
| 4,173,656 | A | 11/1979 | Duggins |
| 4,932,272 | A | 6/1990 | Hogg |
| 4,956,194 | A * | 9/1990 | Gos .................. C12G 3/07 426/592 |
| 5,972,401 | A | 10/1999 | Kowalski |
| 6,203,836 | B1 * | 3/2001 | Gross, II ............. C12J 1/08 426/422 |
| 6,681,686 | B1 | 1/2004 | Chiu |
| 7,171,825 | B2 | 2/2007 | Matsuoka et al. |
| 7,866,254 | B1 | 1/2011 | Karasch et al. |
| 8,889,206 | B2 | 11/2014 | Lix |
| 2002/0168446 | A1 | 11/2002 | Zimlich, III et al. |
| 2009/0136638 | A1 | 5/2009 | Fujie et al. |
| 2010/0092636 | A1 | 4/2010 | Watson et al. |
| 2011/0070331 | A1 | 3/2011 | Watson |
| 2012/0088018 | A1 | 4/2012 | Lix |
| 2012/0132082 | A1 | 5/2012 | Baird et al. |
| 2012/0164300 | A1 | 6/2012 | Niazi |
| 2013/0149423 | A1 | 6/2013 | Lix |
| 2015/0017297 | A1 | 1/2015 | Vastardis et al. |
| 2015/0197716 | A1 | 7/2015 | Davis |

FOREIGN PATENT DOCUMENTS

| | | | | |
|---|---|---|---|---|
| DE | 279497 | A1 | 6/1990 | |
| EP | 1438897 | A1 | 7/2004 | |
| JP | 13-012055 | Y | 8/1938 | |
| JP | 3094680 | U | 7/2003 | |
| JP | 2011160784 | A | 8/2011 | |
| JP | 2013081443 | A | 5/2013 | |
| JP | 2015202105 | A | 11/2015 | |
| RU | 2084510 | C1 | 7/1997 | |
| WO | WO-2015013704 | A2 * | 1/2015 | ............. C12G 3/065 |

OTHER PUBLICATIONS

Declaration of Daniel Martin Watson dated Apr. 22, 2015 in the prosecution history of U.S. Appl. No. 12/957,108 (Application Publication No. 20110070331).

Jaganathan, James, et al., "Authentication of straight whiskey by determination of the ratio of furfural to 5-hydroxymethyl-2-furaldehyde," Journal of AOAC International 82.4 (1999): 997-1001 (5 pages).

Macnamara, K., et al., "Flavour components of whiskey. II Ageing changes in the high-volatility fraction," South African Journal of Enology and Viticulture 22.2 (2001): 75-81 (7 pages).

Williams, Rhett, "Science of Barrel Aging," Shakestir, Feb. 18, 2013, retrieved from https://www.shakestir.com/features/id/551/science-of-barrel-aging on Feb. 24, 2022 (3 pages).

Spedding, Gary, "Eighty Years of Rapid Maturation Studies Why Are We Not There Yet," American Distilling Institute (2021) (110 pages).

Watson, Daniel Martin, "Declaration of Daniel Martin Watson Under 37 C.F.R. § 1.132," dated Apr. 22, 2015, filed in U.S. Appl. No. 12/957,108 on Jun. 16, 2016 (12 pages).

Appeal Brief, filed in U.S. Appl. No. 12/957,108 on Jun. 16, 2016 (10 pages).

Examiner's Answer to Appeal Brief, filed in U.S. Appl. No. 12/957,108 on Mar. 13, 2017 (17 pages).

Reply Brief, filed in U.S. Appl. No. 12/957,108 on May 15, 2017 (2 pages).

Decision on Appeal in U.S. Appl. No. 12/957,108 dated Jun. 22, 2017 (9 pages).

* cited by examiner

FIG. 2

|  | 60 g wood chips per 750 ml spirits | 45 g wood chips per 750 ml spirits | 30 g wood chips per 750 ml spirits | 15 g wood chips per 750 ml spirits |
| --- | --- | --- | --- | --- |
| 1 cycle of aging | X | X | X |  |
| 2 cycles of aging | X | X | X |  |
| 3 cycles of aging |  | X | X |  |
| 4 cycles of aging |  | X | X |  |
| 5 cycles of aging |  |  | X |  |
| 6 cycles of aging |  |  |  | X |

ALCOHOLIC BEVERAGE AND METHOD OF MAKING THE SAME

CROSS-REFERENCE TO RELATED APPLICATION

The present application claims priority to provisional U.S. Patent Application No. 62/242,396 as filed Oct. 16, 2015.

STATEMENT REGARDING FEDERALLY SPONSORED RESEARCH

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to alcoholic beverages, and more specifically relates to a method, and resulting spirits, for imparting the sensory characteristics of a matured distilled spirit to a younger distilled spirit.

2. Description of the Related Art

In traditional whiskey-making methods, a high proof distillate is aged in an oak barrel and the wood adds color, smoothness, flavor, and other characteristics to the whiskey. But wood barrels are becoming increasingly expensive and their porosity (while important to the aging process) can result in significant evaporation loss.

In addition to the cost issue related to wood expense is the actual aging process where a particular spirit may be aged anywhere from 3 to 50 or more years. Generally speaking, the longer aged spirits are able to interact more with the wood of the barrels and develop a more refined flavor, taste, color, finish, and smoothness as desired by consumers.

Compounding this issue is the fact that aged whisky stocks are declining and those in the "Baby Boomer" generation are declining, and this is the age group that consumed the traditional scotch whisky and other aged distilled spirits.

Young spirits tend to be harsh and rough on one's palate. It is through interaction with wood, usually in the form of the barrel holding the spirit, that the spirit develops sensory characteristics that consumers generally prefer as measured by purchase preference and perception of "smoothness" and "easy to drink."

It is known in the industry that in the making of bourbon, it is required by law and important for taste to use wood that is new American oak. It is also known in the Scotch whisky industry that barrels become "exhausted" over time and lose their ability to impart flavor transformation in the whisky.

Thus, what is desired is the sensory characteristics that are developed through multiple years of aging with a wood barrel, however, in a significantly shorter period of time so as to reduce product cost and create opportunities for crafting new taste experiences not possible through classic barrel aging.

There have been attempts made to create a younger spirit that has the sensory characteristics of a traditionally aged spirit. Of note is Russian Patent No. 2084510 for "Method Maturation Ethyl Alcohol." The Russian patent describes a process for "accelerated maturation—aging cognac" that includes loading 10 mm thick oak rivets into tanks with alcohol and then increasing the internal pressure of the tank to 2 to 5 ATA for a duration of 24 to 48 hours followed by 24 to 48 hours of no pressure. Although process in the Russian patent is faster than traditional methods, more rapid cycle times to obtain the same results would be preferred.

Other patents such as U.S. Pat. No. 8,889,206 to Lix provide general information about a process for making whiskey in a pressurized container; however, does not provide many details on the process aside from teaching to profile the staves placed in the container with the alcohol.

US Patent Application Publication No. 2010/092636 to Watson describes a method for "accelerating aging of ethanol-based beverages" that very generally describes such method using pressures of at least 200 psi to 5000 psi, and pressures below that are "not sufficient to produce" the desired reactions. However, such pressures are highly expensive to realize in production and not achievable in the majority of production facilities.

Thus, what is needed is a method for providing the sensory impression of a matured distilled spirit, but at a total process time of less than a day and at lower applied pressures.

SUMMARY

The present invention is a method for imparting the sensory characteristics of a matured distilled spirit to a younger distilled spirit. The method is comprised of the steps of: introducing a distilled spirit having an alcohol content of about 40% to about 57% to a container; adding wood chips at a ratio of about 10 to about 120 grams per 750 mL of the raw distilled spirit to the container; sealing the container; and increasing an internal pressure of the container to about 5 psi to about 50 psi such that when a maximum predetermined pressure is achieved within the container, the pressure is then released and the internal pressure is reduced. And the increasing and decreasing the internal pressure of the container can be repeated as needed.

DRAWINGS

FIG. 2 is a chart showing results of an experiment according to the present invention using a distilled spirit having 42% alcohol content at a pressure of 15 psi.

DESCRIPTION

Figure 1:
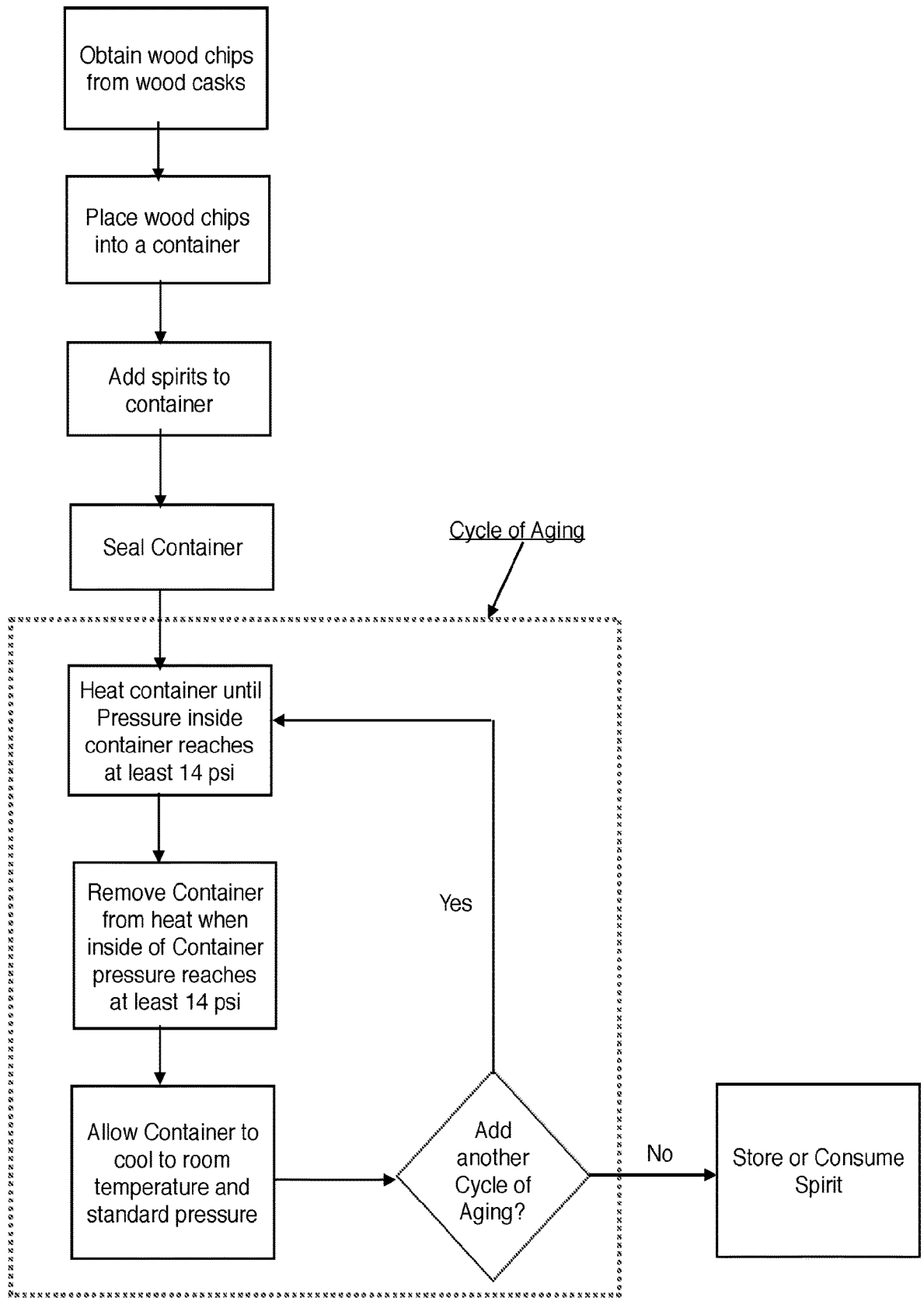
FIG. 1 is a flowchart showing a method for rapidly aging a spirit.

Referring to the FIG. 1, the present invention includes a method for imparting the sensory characteristics of a traditionally aged distilled spirit to a younger distilled spirit in a significantly shorter time period.

It should be noted that the features of the present method are directed to a particular consumer market. In particular, the features of the present method provide sensory characteristics in flavor, texture, color, smoothness, and ease of drinking in a distilled spirit that have been found to appeal to the generation currently identified as "millennials," which generally includes individuals born between 1980 and 2000.

When this method was researched consumers aged 21 to 39 were researched in alignment with alcohol consumption laws. These sensory characteristics of the distilled spirit according to the present method may not be as palatable, as a whole, to traditional whiskey, bourbon, or other distilled spirit drinkers. However, the millennials are growing to be the most powerful consumers, and as such, the examples and surveys conducted with finished products according to the present method are primarily focused on millennials. And as is industry practice across fields, one needs to attract a younger demographic, that can legally use its products, as they are being introduced to a new category of goods and services.

The method begins by first obtaining wood chips. The wood chips may be from previously-used casks. However, the wood chips may also come from other sources so long as the wood is prepared as is generally known in the industry.

In an exemplary embodiment, the wood chips have primary side (length×width) dimensions of about 1 to about 2 inches in length, about ½ to about 1 inch in width, and a thickness of about ⅛ to about ¼ inch. Although the wood chips are discussed as being substantially rectangular in shape, it is understood by those of ordinary skill in the art that the wood chips will vary in shape and size and may not be uniform in dimensions.

The wood chips are introduced to a container, and a spirit is introduced to the wood chips in the container.

In addition to or as an alternative to the wood chips, nut shells can be used to mix with the spirits in the present method.

As set forth in the background, it is required and important to use new American oak as the wood for making bourbon. It is also known in the Scotch whisky industry that barrels become "exhausted" over time and lose their ability to impart flavor transformation to the whisky. In the present invention, the wood chips may be derived from the wood barrels that are considered no longer useful in making whiskey/whisky. In an exemplary embodiment, the wood is from barrels or other sources that have allowed the wood to be air dried for at least to years. In yet another exemplary embodiment, the wood is from barrels or other sources that have allowed the wood to be air dried for at least 100 years The term spirit, used throughout, refers to a distilled beverage that has at least 5% alcohol by volume (ABV). The spirit herein can be a young or aged spirit, where an aged spirit needs to be in wood for at least three years according to some countries regulations, and a young spirit is defined as a new make spirit. The present method allows further processing and/or finishing of such young or aged spirit.

The spirit may be any of whiskey, scotch whisky, bourbon, vodka, gin, rum, brandy, eau de vie (fruit brandy or schnapps), tequila, baijiu, soju, aguardiente, pilinka, cachaca, singani, borovicka, slivovitz, moonshine, raw or young spirit, or a combination thereof.

The ratio of wood chips to alcohol is a critical feature of the present invention. It has been found that with 750 mL (a standard bottle) of spirits having an amount of wood chips should be between 30 grams (g) and 120 g. The actual value of wood chips varies based on desired sensory characteristics of the resulting spirit. The percent alcohol is a critical feature of the present invention. It has been found that the percent alcohol of the spirit for the present invention is preferred to be about 40% to about 57%.

The container holding the mixture of wood chips and spirits is sealed and heated until the measured pressure of the inside of the sealed container increased to a minimum of 5 psi and not to be greater than about 50 psi. It is critical that the pressure not exceed 50 psi as non-desirable sensory characteristics of the wood chips may be drawn out into the resulting spirit.

Experimentation has shown that the increased pressure within the container forces the spirit molecules into the wood chips, thus ensuring the spirit interact with more than just the surface of the wood chips. As the pressure is decreased, the spirit moves back out of the wood chips, causing an interaction where some of the inner parts of the wood may be introduced to the spirit and some parts may interact with the spirit to create new compounds.

It is most preferred that the pressure be between about 10 psi and about 20 psi. It is noted that this lower pressure runs contrary to the prior art and what those of ordinary skill in the art argue the pressure should be. However, it has been found that this lower pressure keeps the resulting alcohol from being contaminated with the undesirable features of the wood chips that is extracted at a higher pressure thereby imparting the less desired sensory characteristics to the distilled spirits for the consumers of interest.

The container is then removed from the heat and allowed to cool to substantially room temperature and the pressure within the inside of the container is reduced to a predetermined low pressure.

Heating the container with the mixture of wood chips and spirit to about 5 psi to 20 psi atmosphere, followed by allowing the container temperature to cool and reach standard pressure is considered as a single cycle of aging.

As the maximum amount of pressure is reached within the container, the pressure is preferably then lowered to reach standard pressure. In other words, the contents of the container are not held at the maximum pressure for a long period, less than about 24 hours based on sensory characteristics desired, of time. However, it is preferred that once the maximum pressure is reached, it is reduced. The actual time for each cycle will vary based on the amount of spirit, wood, maximum pressure, the desired taste character, production efficiency and the like.

The mixture of spirit and wood chips go through 1 or more cycles of aging, the actual number of cycles varied based on desired sensory characteristics of the resulting rapidly aged spirit. The cycles are required to have the spirit and the wood chips interact to provide the desired sensory characteristics of the resulting distilled spirit for a millennial consumer.

A more preferred number of cycles is 2-5 per resulting distilled spirit.

After the desired number of cycles of aging is conducted, the resulting spirit is filtered to separate it from the wood chips and other particulate matter. The rapidly-aged spirit may then be stored or consumed.

It has been surprisingly found that charring the wood chips on at least one of the two primary sides, or the whole chip, increases process according to the present invention. This means that charring the wood chips on at least one side before mixing with the spirit and undergoing one or more cycles imparts a greater amount of color and flavor from the wood chips to the spirit in fewer cycles. Or said another way, the charring of the wood changes the different sensory characteristics imparted to the spirit.

In another embodiment, the wood chips are toasted in addition or as an alternative to charring the wood chips. Like with charring, toasting the wood changes the different sensory characteristics imparted to the spirit.

Alternatively, or in conjunction to charring the wood chips, the wood chips may be smoked prior to introduction to container and being mixed with the spirits. As is classically done, the entire chips can also be charred or toasted.

As known in the industry, particular wood barrels impart different sensory characteristics to the held spirit. For example, scotch whiskey is finished in sherry oak casks. So, in yet another variation of the present invention, the wood chips are prepped by the procedure known in the industry as finishing.

The actual number of cycles of aging for the spirit to undergo will vary based in part on the ratio of wood chips to spirits, the wood chips charred condition, the type of wood chips, the type of spirit. FIG. 2 shows the results of experimentation using 3 year aged scotch whisky, the minimum age to be legitimately considered as a scotch whisky, and sherry oak cask wood chips charred on a single size. The scotch whisky had a 42% alcohol content and the contents were taken to a a pressure of 15 psi. Those cells of the matrix marked with an "X" were found to achieve the desired sensory characteristics, of a whiskey from Scotland that has been aged longer.

Embodiment 1

A distilled spirit, a whisky, according to the present invention was prepared with the following dimensions:
Amount of wood chips 30 g
Amount of spirit 750 mL
Percent of alcohol in spirit 42%
Maximum pressure per cycle 15 psi
Number of cycles 4

The resulting distilled spirit was also 42% alcohol. It was tested in a paired comparison blind test against one of the top two selling super-premium, 18 year whiskeys based on US and International Sales. It was tested with a random sample of 21 to 39 year old Americans. For purchase intent, the present invention in Embodiment 1 was preferred versus the super-premium whisky 71% to 29%.

Embodiment 2

A distilled spirit, a whisky, according to the present invention was prepared with the following dimensions:
Amount of wood chips 120 g
Amount of spirit 750 mL
Percent of alcohol in spirit 42%
Maximum pressure per cycle 15 psi
Number of cycles 4

The resulting distilled spirit was also 42% alcohol. It was tested in a paired comparison blind test against Embodiment 1, with a random sampling of 21 to 39 year old Americans. For purchase intention, Embodiment 2 lost to Embodiment 1 by 43% to 57%. In the same pairing, Embodiment 2 lost in consumers perception of "smoothness" and perception of "easy to drink." These results helped support the upper limit of the ratio of wood chips to alcohol.

Embodiment 3

A distilled spirit, again a whisky, according to the present invention was prepared with the following dimensions:
Amount of wood chips 30 g
Amount of spirit 750 mL
Percent of alcohol in spirit 57%
Maximum pressure per cycle 15 psi
Number of cycles 4

The resulting distilled spirit was also 57% alcohol. It was tested in a paired comparison blind test against Embodiment 1, with a random sampling of 21 to 39 year old Americans. For purchase intent, Embodiment 3 lost to Embodiment 1 by 34% to 66%. In the same pairing the present Embodiment 3 lost in consumers perception of "smoothness" and in perception of "easy to drink." These results helped support the upper limit of the percent alcohol.

Embodiment 4

A distilled spirit, a whisky, according to the present invention was prepared with the following dimensions:
Amount of wood chips 30 g
Amount of spirit 750 mL
Percent of alcohol in spirit 42%
Maximum pressure per cycle 50 psi
Number of cycles 4

The resulting distilled spirit was also 42% alcohol. It was tested in a paired comparison blind test against Embodiment 1, with a random sampling of 21 to 39 year old Americans. For purchase intent, Embodiment 4 lost to Embodiment 1 by 37% to 63%. In the same pairing the present Embodiment 4 lost in consumers perception of "smoothness" and in perception of "easy to drink." These results helped support the upper limit of the maximum pressure per cycle.

Embodiment 5

A distilled spirit, a whisky, according to the present invention was prepared with the following dimensions:
Amount of wood chips 30 g
Amount of spirit 750 mL
Percent of alcohol in spirit 42%
Maximum pressure per cycle 15 psi
Number of cycles 4

And the wood chips were sourced from wood that had been air dried for at least 100 years. The resulting distilled spirit was also 42% alcohol. It was tested in a paired comparison blind test against one of the top selling super-premium bourbons. It was tested with a random sample of 21 to 39 year old Americans. For purchase intent, the present invention in Embodiment 5 was preferred versus the super-premium bourbon 66% to 34%.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for imparting the sensory characteristics of a more matured distilled spirit to a distilled spirit, the steps being comprised of:
introducing a distilled spirit having an alcohol content of about 40% to about 57% to a container;

adding wood chips at a ratio of about 10 to about 120 grams per 750 mL of the raw distilled spirit to the container;
sealing the container such that the container has a fixed mass of gas;
heating the container until an internal pressure of the container reaches a predetermined maximum pressure of 15 psi;
cooling the container until the internal pressure reaches a predetermined lower pressure; and
cycling the heating step and the cooling step from 2 to 10 times, wherein the container is sealed for a duration of the step of cycling the heating step and the cooling step, and wherein the method has a total process time of less than a day.

2. The method according to claim 1, further comprising cycling the heating step and the cooling step for a total of 10 times.

3. The method according to claim 1, further comprising cycling the heating step and the cooling step for a total of 2 to 6 times.

4. The method according to claim 1, wherein the wood chips are added at a ratio of about 20 to about 80 grams per 750 mL of the distilled spirit to the container.

5. The method according to claim 1, wherein the wood chips are added at a ratio of about 30 to about 50 grams per 750 mL of the distilled spirit to the container.

6. The method according to claim 1, wherein the alcohol content of the distilled spirit is about 40% to about 45%.

7. The method according to claim 1, wherein the internal pressure of the container is increased to a maximum of about 10 psi to less than 15 psi.

8. The method according to claim 1, further comprising filtering the distilled spirit from the wood chips in the container.

9. The method according to claim 1, wherein the wood chips are charred or toasted on at least one side and finished prior to introduction to the container.

10. The method according to claim 1, wherein the wood chips are smoked prior to introduction to the container.

11. The method according to claim 1, wherein the wood chips are finished prior to introduction to the container.

12. The method according to claim 1, wherein the wood chips are sourced from wood barrels that are deemed no longer useful in making whiskey.

13. The method according to claim 1, wherein the wood chips are sourced from wood that has been air dried for at least 10 years.

14. The method according to claim 1, wherein the wood chips are sourced from wood that has been air dried for at least 100 years.

15. The method according to claim 1, wherein the wood chips have a primary side (length×width) dimension of about 1 to about 2 inches in length, about ½ to about 1 inch in width, and a thickness of about ⅛ to about ¼ inch.

16. A method for imparting the sensory characteristics of a more matured distilled spirit to a distilled spirit, the steps being comprised of:
introducing a distilled spirit having an alcohol content of about 40% to about 50% to a container;
adding wood chips at a ratio of about 30 to about 60 grams per 750 ml of the raw distilled spirit to the container;
sealing the container such that the container has a fixed mass of gas;
heating the container until an internal pressure of the container reaches a predetermined maximum pressure of 15 psi;
cooling the container to further modulate pressure within the container until the internal pressure is reduced back to a lower predetermined pressure; and
cycling the heating step and the cooling step from 2 to 6 times, wherein the container is sealed for a duration of the step of cycling the heating step and the cooling step, wherein the method has a total process time of less than a day.

17. A finished distilled spirit having the sensory characteristics of a more matured distilled spirit produced by the steps comprising:
introducing a distilled spirit having an alcohol content of about 40% to about 57% to a container;
adding wood chips at a ratio of about 10 to about 120 grams per 750 mL of the raw distilled spirit to the container;
sealing the container such that the container has a fixed mass of gas;
heating the container until an internal pressure of the container reaches a predetermined maximum pressure of 15 psi,
once the predetermined maximum pressure is reached, cooling the container until the internal pressure is reduced back to a lower predetermined pressure;
cycling the heating step and the cooling step from 2 to 10 times over a time period of less than a day, wherein the container is sealed for a duration of the step of cycling the heating step and the cooling step; and
filtering the distilled spirit from the wood chips in the container.

18. The finished distilled spirit of claim 17, further comprising cycling the heating step and the cooling step for a total of 10 times.

19. The finished distilled spirit according to claim 17, further comprising cycling the heating step and the cooling step for a total of 2 to 6 times.

20. The finished distilled spirit according to claim 17, wherein the wood chips are added at a ratio of about 20 to about 80 grams per 750 mL of the distilled spirit to the container.

21. The finished distilled spirit according to claim 17, wherein the wood chips are added at a ratio of about 30 to about 50 grams per 750 mL of the distilled spirit to the container.

22. The finished distilled spirit according to claim 17, wherein the alcohol content of the distilled spirit is about 40% to about 45%.

23. The finished distilled spirit according to claim 17, wherein the wood chips are charred on at least one side and finished prior to introduction to the container.

24. The finished distilled spirit according to claim 17, wherein the wood chips are smoked prior to introduction to the container.

25. The finished distilled spirit according to claim 17, wherein the wood chips are finished prior to introduction to the container.

26. The finished distilled spirit according to claim 17, wherein the wood chips are sourced from wood barrels that are deemed no longer useful in making whiskey.

27. The finished distilled spirit according to claim 17, wherein the wood chips are sourced from wood that has been air dried for at least 10 years.

28. The finished distilled spirit according to claim 17, wherein the wood chips are sourced from wood that has been air dried for at least 100 years.

29. The finished distilled spirit according to claim 17, wherein the wood chips have a primary side (length x width)

dimension of about 1 to about 2 inches in length, about ½ to about 1 inch in width, and a thickness of about ⅛ to about ¼ inch.

* * * * *